Sept. 14, 1965  M. F. REIJNST  3,206,655
MAGNET SYSTEM COMPRISING TWO STRUCTURALLY IDENTICAL PARTS
Filed March 13, 1957
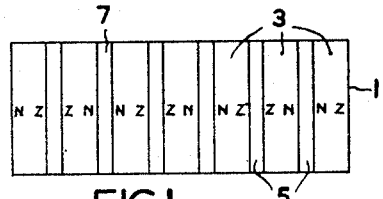
FIG.1
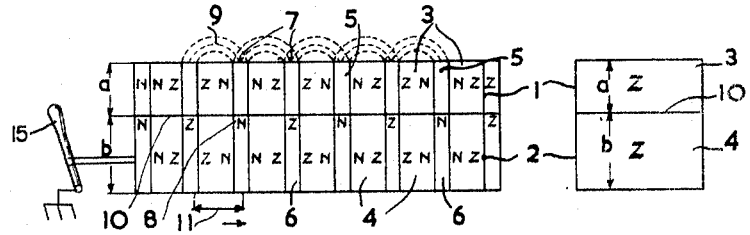
FIG.2  FIG.3
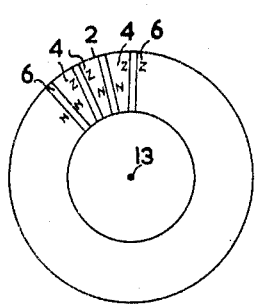 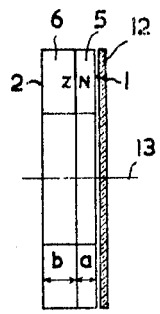
FIG.4  FIG.5
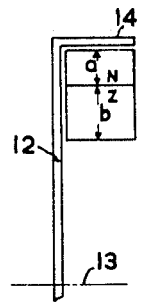 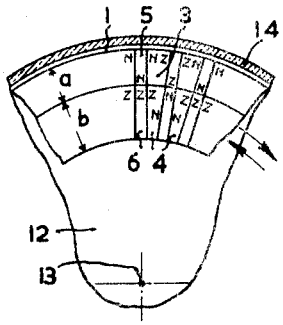
FIG.6  FIG.7
INVENTOR
M. F. REIJNST
BY
AGENT 3,206,655
MAGNET SYSTEM COMPRISING TWO STRUCTURALLY IDENTICAL PARTS
Maximilien Felix Reijnst, Eindhoven, Netherlands, assignor to North American Philips Company Inc., Irvington on Hudson, N.Y.
Filed Mar. 13, 1957, Ser. No. 645,808
Claims priority, application Netherlands, Apr. 22, 1954, 186,952; Apr. 26, 1956, 206,678
11 Claims. (Cl. 317—159)

This application is a continuation-in-part of my prior co-pending application, Serial No. 502,171, filed April 18, 1955, now abandoned.

The invention relates to a magnet system consisting of two structurally identical parts, each part comprising a plurality of plate-shaped permanent magnets, magnetized in the direction of thickness, and intermediate plate-shaped bodies of high permeability, the polarities of the magnet poles adjacent a plate-shaped body of high permeability being identical and the parts being arranged to engage one another and to be displaceable relative to one another in a manner such that in one position identical poles of each of the parts are opposite one another, so that in this position an active field is obtained.

By displacing one of the parts by a pole pitch the active field is rendered at least substantially inoperative. In practice, however, this means that in the short-circuited position of the magnets the active field may yet have for example 30% of the initial value. This is due to the fact that, in order to obtain a high field strength at the ends of the plate-shaped bodies of high permeability, these bodies must be proportioned so that they are almost saturated or wholly saturated magnetically so that the short-circuit is not complete in the short-circuit condition. If the system is used for example as a permanent magnet chuck, this does not give rise to difficulties in disengaging larger work pieces that can be readily seized, since the adhesive force drops to about 10% of the initial value, but in the case of smaller, for example, flat work pieces the remaining adhesive force is too great to permit an easy detachment.

This difficulty is mitigated in that with the magnet system of the aforesaid kind the dimensions of the magnets of one part, measured at right angles to the partition plane between the parts, are smaller than the corresponding dimensions of the magnets of the other part. Thus, in the aforesaid short-circuit condition of the magnets the remaining flux on the opposite part of the part of smaller size is materially reduced. With correct proportioning the flux can be reduced to zero and its polarity may even be reversed, which will be explained more fully in the following description of one embodiment.

The permanent magnetic material may be a material that can substantially not be demagnetized, for example the ceramic permanent magnet material indicated in U.S. Patents Nos. 2,762,777 and 2,762,778.

When using this material the length of the part of smaller size is 35 to 48% of the total length of the two parts together, more particularly, 40 to 45%, if the system is designed for high saturation.

Such a magnet system is suitable for various uses and is thus a universal system.

Potential uses are magnetic filters, lifting magnets, magnetic chucks, magnetic brakes; in general in those cases, in which a control of the strength of a magnetic field is desired in a wide range from a minimum value to a maximum value.

With reference to a few diagrammatically shown embodiments the invention will be described more fully.

FIGS. 1, 2 and 3 are a plan view, a side view and a front view respectively of a magnet system according to the invention.

The system consist of two parts 1 and 2, each of which comprises a plurality of plate-shaped permanent magnets, 3, and 4 respectively having a thickness of 5 mms. with intermediate, plate-shaped bodies 5 and 6 respectively having a thickness of 3 mms. of a material having a high permeability for example soft iron. The plate-shaped magnets are magnetized in the direction of thickness and the poles of the magnets adjacent a plate-shaped body on either side thereof have the same polarities. The part 2 is arranged by suitable holding means not shown in contact with part 1 in a manner such that the poles 7 and 8 of the plate-shaped bodies 5 and 6, in which the lines of force are strongly concentrated owing to the dimensions of these bodies, have equal polarities, so that a strongly active field 9 is obtained.

The dimension $a$ of the magnets of the part 1, measured at right angles to the partition plane 10 between the two parts 1 and 2, is smaller than the corresponding dimension $b$ of the magnets of the parts 2. In the following table the influence of the choice of the dimension $a$ relative to the dimension $b$ on the value of the flux is indicated both for the position shown in FIG. 2 and for the case in which the part 2 is displaced for example to the right relatively to the part 1 over a pole pitch 11, e.g., by means of a handle shown schematically at 15. After this displacement poles of unidentical polarities of the plate-shaped bodies 5 and 6 are opposite one another, so that the magnet system is at least partly short-circuited.

| $a$ in mms. | $b$ in mms. | Active flux 9 in Maxwell | Flux in Maxwell in "short-circuit" position |
|---|---|---|---|
| (1) 28 | 32.8 | 23,500 | +8,800 |
| (2) 27 | 32.8 | 23,300 | +7,780 |
| (3) 26 | 32.8 | 23,400 | +5,550 |
| (4) 25 | 32.8 | 23,200 | +3,480 |
| (5) 23.5 | 32.8 | 23,400 | +590 |
| (6) 23.5 | 32.8 | 23,300 | +50 |
| (7) 23 | 32.8 | 23,400 | −1,050 |

From Example 6 it is evident that the dimension $a$ is so much smaller than the dimension $b$ that at displacement of the part 2 through a pole pitch 11 the active field of the part 1 is substantially compensated.

From Example 7 it follows that the dimension $a$ is so much smaller that at a displacement of part 2 through a distance smaller than a pole pitch 11 the active field of part 1 is also substantially compensated.

If the displacement is performed through a complete pole pitch, the active field reverses its polarity (−1050 Maxwell). This may be advantageous in those cases in which the work pieces are for example of steel, so that at a compensation of the flux (Example 6) a certain remanent magnetisation of the work pieces is maintained. This may, in turn, be compensated by means of the counter magnetisation as in Example 7.

FIGS. 4 and 5 show the use of the same principle for a magnetic brake. A disc 12 of non-ferromagnetic material of small electrical resistance, for example copper, is arranged so as to be rotatable about a shaft 13.

On one side of the disc annular parts 1 and 2 are arranged; these parts consist alternately of a plurality of plate-shaped permanent magnets 3 and 4 respectively and plate-shaped bodies 5 and 6 respectively. As in the chuck, if unlike poles are opposite one another, as shown in FIG. 5, the external field is a minimum and the disc is intersected by the minimum flux of lines, so that the braking effect will be at a minimum under the influence of the Focault (eddy) currents. After a displacement in a tangential direction of, for example, part 2 through a pole pitch, the external field is a maximum and the braking effect will be at a maximum. Thus the braking effect, which may be very powerful owing to the large number of magnetic poles, can be controlled within wide limits.

Such a brake, in the form of a drum brake, is shown in FIGS. 6 and 7. The brake drum is designated by 14 and the annular parts 1 and 2 are concentrical within the cylindrical part 14. It operates in the same manner as the brake shown in FIGS. 4 and 5.

What is claimed is:

1. A magnetic circuit producing a controllable external magnetic field, comprising a pair of abutting, cooperating members, each of said members comprising a plurality of thin permanent magnets and a plurality of thinner soft magnetic bodies constituted of high permeability material, said magnets being magnetized in the direction of thinness producing poles of like polarity on adjacent facing surfaces of each pair of magnets, said magnets and bodies being alternately arranged in abutting relationship whereby opposed surfaces of each soft magnetic body confront poles of the same polarity on the permanent magnets, said members being displaceable relative to one another over a distance of about the spacing between adjacent soft magnetic bodies, whereby in one position poles of like polarity in the different members face one another producing a strong external magnetic field, and whereby in another position poles of opposite polarity in the different members face one another.

2. A circuit as set forth in claim 1, wherein the members have annular shapes, and a rotatable, circular, non-magnetic, electrically-conductive member is operatively associated with said members.

3. A circuit as set forth in claim 2, wherein the annular members are concentric with one another, and the non-magnetic member is cylindrical.

4. In a magnetic chuck, a work holding ring comprising a magnetic annulus having a work-receiving face and including alternately and circumferentially spaced permanent magnetic segments and segments subject to magnetic induction, said magnetic segments having their magnetic poles established along a circumferentially extending arc of said annulus, alternate of said magnetic segments being magnetically aligned in one circumferential direction and the remainder of said magnetic segments being magnetically aligned in the other circumferential direction, and control means for said holding ring for establishing and disestablishing magnetic circuits in said work-receiving face.

5. A permanent magnet type magnetic chuck having a workpiece holding face which may be magnetically excited throughout its width, said chuck comprising a work holding portion having a workpiece mounting surface providing said face and a chuck control portion mounted in continuous contact with and movable relative to said work holding portion, each of said portions having alternately spaced permanent magnets and magnetically inducible element so arranged that alternating of said elements are induced to become magnetic north poles and the remaining of said elements are induced to become magnetic south poles, said control portion being magnetically aligned in a first position relative to said work holding portion to magnetically energize said face and movable to be magnetically aligned in a second position relative to said work holding portion to magnetically de-energize said face.

6. In a magnetic chuck, a workpiece holding annulus for magnetically holding a workpiece against axial and shear forces when said annulus has the workpiece holding face thereof magnetically energized, said annulus having magnetic-induceable elements extending radially and axially of said annulus and magnetic-inducing elements alternately arranged in tight engagement therewith for inducing magnetic flux to pass through the annulus workpiece holding face whereby the face is magnetically energized, and means adjacent said workpiece holding annulus opposite the annulus workpiece holding face and arcuately movable relative thereto for causing said annulus workpiece holding face to be selectively magnetically energized and de-energized.

7. In a permanent magnet type magnetic chuck, a workpiece holding annulus and a chuck control annulus coaxially mounted in contact with said holding annulus and arcuately movable relative thereto, said holding annulus being comprised of a plurality of alternately arranged and contacting permanent magnets and magnetic-induceable elements, said permanent magnets each having a magnetic north pole at a side contacting one adjacent magnetic-induceable element and a magnetic south pole at a side contacting the other adjacent magnetic-induceable element.

8. The magnetic chuck of claim 7, said chuck control annulus comprising circumferentially and alternately arranged and contacting permanent magnets and magnetic-induceable elements respectively alignable with the magnets and elements of said workpiece holding annulus in a first arcuate position of the control annulus to reinforce the magnetic field of said workpiece holding annulus at said work holding surface and alignable in a second arcuate position to short out the magnetic field of said workpiece holding annulus so that there is substantially zero magnetic field force at said work holding surface.

9. The magnetic chuck of claim 8, said chuck control annulus being arcuately positionable at a position intermediate to said first and second arcuate positions and causing the magnetic field in the magnetic-induceable elements of said workpiece holding annulus to reverse direction, thereby creating a magnetic bucking effect to substantially eliminate residual magnetism at the work holding surface.

10. A controllable permanent magnet holding device comprising a work-holding section and a control section, said work-holding section comprising a first array of plural permanent magnets and interposed flux-conductive spacer elements and having an exposed work-holding surface, the magnets having major axes and minor transverse axes both parallel to the work-holding surface and being magnetized along their minor transverse axes, successive magnets from one end of the first array to the other having alternately opposite polarities to present like poles of adjacent magnets on each side of a common flux-conductive spacer element, said control section comprising a second array of permanent magnets and interposed flux-conductive spacer elements, the transverse dimensions of magnets and spacers and their orientation, and the orientation of the magnetic axes of the magnets of the second array corresponding substantially to those of the first array, the control section being movably mounted adjacent the work-holding section and having a surface in contact with the surface of the first array opposite to the work-holding surface, said control section being movable relative to the work-holding section in the direction of the minor magnetic axes of the magnets between a work-holding position in which the magnets of the first array register in contact with the magnets of the second array with like poles of registering pairs of magnets together producing a relatively strong holding field at the work-holding surface, and a work-release position in which the magnets of the arrays substantially register and contact with one another with both poles of the magnets of the first array in unlike pole relationship to both poles of the registering magnets of the second array producing a relatively weak field at the work-holding surface.

11. A controllable permanent holding device comprising a work-holding section and a control section, said work-holding section comprising a first array of plural plate-like permanent magnets of equal size and interposed flux-conductive spacer elements of equal size and having an exposed work-holding surface, the magnets having major axes and minor transverse axes both parallel to the work-holding surface and being magnetized along their minor transverse axes, successive magnets from one end of the first array to the other having alternately opposite polarities to present like poles of adjacent magnets on each side of a common flux-conductive spacer element, said control section comprising a second array of permanent magnets and interposed flux-conductive spacer elements, the transverse dimensions of magnets and spacers and their orientation, and the orientation of the magnetic axes of the magnets of the second array corresponding substantially to those of the first array, the control section being movably mounted adjacent the work-holding section and having a surface contacting the surface of the first array opposite to the work-holding surface, and means for moving the control section relative to the work-holding section in the direction of the minor magnetic axes of the magnets between a work-holding position in which the magnets of the first array register in contact with the magnets of the other array with like poles of registering pairs of magnets together producing a relatively strong holding field at the work-holding surface, and a work-release position in which the magnets of the arrays substantially register and contact with one another with both poles of the magnets of the first array in unlike pole relationship to both poles of the registering magnets of the second array producing a relatively weak field at the work-holding surface.

References Cited by the Examiner

UNITED STATES PATENTS

| | | | |
|---|---|---|---|
| 2,613,246 | 10/52 | Spodig | 317—159 |
| 2,678,729 | 5/54 | Spodig | 317—201 X |
| 2,722,617 | 11/55 | Cluwen et al. | 317—159 |
| 3,079,535 | 2/63 | Schultz | 317—159 |

FOREIGN PATENTS

| | | |
|---|---|---|
| 531,600 | 1/41 | Great Britain. |
| 880,841 | 6/53 | Germany. |

JOHN F. BURNS, *Primary Examiner.*

LLOYD McCOLLUM, *Examiner.*